US008752464B2

(12) United States Patent
Vaughan

(10) Patent No.: US 8,752,464 B2
(45) Date of Patent: Jun. 17, 2014

(54) SLICE BLADE ASSEMBLY WITH NON-WELDED REPLACEABLE BLADES

(75) Inventor: Tim Vaughan, Pueblo West, CO (US)

(73) Assignee: Atlas Pacific Engineering Co., Pueblo, CO (US)

( * ) Notice: Subject to any disclaimer, the term of this patent is extended or adjusted under 35 U.S.C. 154(b) by 239 days.

(21) Appl. No.: 13/507,312

(22) Filed: Jun. 20, 2012

(65) Prior Publication Data

US 2012/0325069 A1 Dec. 27, 2012

Related U.S. Application Data

(60) Provisional application No. 61/571,402, filed on Jun. 27, 2011.

(51) Int. Cl.
*B26D 7/26* (2006.01)
*A47J 25/00* (2006.01)

(52) U.S. Cl.
USPC .......... 83/698.11; 83/698.13; 83/932; 99/545

(58) Field of Classification Search
CPC .. B26D 3/26; B26D 1/0006; B26D 2003/288; B26D 7/2614; B26D 1/03; B26D 3/10; B26D 7/0006; B26D 1/48; B26D 1/09; B26D 1/44
USPC ........ 83/698.11, 859, 620, 932, 639.1, 581.1, 83/114, 698.13, 857
See application file for complete search history.

(56) References Cited

U.S. PATENT DOCUMENTS

| | | | | |
|---|---|---|---|---|
| 2,496,637 | A * | 2/1950 | Pease | 99/553 |
| 2,703,122 | A * | 3/1955 | Pease et al. | 99/553 |
| 2,750,976 | A * | 6/1956 | Ganze | 99/553 |
| 3,696,847 | A * | 10/1972 | Erekson et al. | 99/545 |
| 3,810,308 | A * | 5/1974 | Stubbmann | 30/130 |
| 4,007,676 | A * | 2/1977 | Ellis | 99/545 |
| 4,553,325 | A * | 11/1985 | Allahverdian | 30/114 |
| 5,520,105 | A * | 5/1996 | Healy | 100/98 R |
| 6,148,709 | A * | 11/2000 | Bucks | 83/663 |
| 7,568,414 | B2 * | 8/2009 | Farid et al. | 83/435.19 |
| 7,610,850 | B2 * | 11/2009 | Jensen et al. | 99/545 |
| 7,913,396 | B2 * | 3/2011 | Wei | 30/114 |
| 2008/0190255 | A1 * | 8/2008 | McCracken et al. | 83/13 |

* cited by examiner

*Primary Examiner* — Ghassem Alie
*Assistant Examiner* — Bharat C Patel
(74) *Attorney, Agent, or Firm* — Bruce H Johnsonbaugh

(57) ABSTRACT

A slice blade assembly for various produce items is provided. A circular array of V-shaped blades is carried in an outer support ring. Each blade is held in place by a new non-welded block and nut which interlock with bent tabs formed at the tips of each blade. Each blade is adjustable since each blade is bendable at its apex. Each worn or damaged blade may be removed and replaced without replacing the block and nut that support the blade.

2 Claims, 13 Drawing Sheets

SLICE BLADE ASSEMBLY WITH NON-WELDED REPLACEABLE BLADES

CROSS REFERENCE TO RELATED APPLICATION

This application claims the benefit of and priority from U.S. provisional application Ser. No. 61/571,402 filed Jun. 27, 2011.

BACKGROUND

The present invention pertains generally to slice blade assemblies used in automatic, high speed equipment for slicing apples and other produce items such as (without limitation) pears, mango, kiwi, melon, pineapple and potatoes. More particularly, the present invention is a distinct improvement over the blade assembly of U.S. Pat. No. 7,610,850 (the ’850 patent) incorporated herein by reference.

The blade assembly of the ’850 patent, although a major improvement over earlier slice blade assemblies, has several drawbacks. First, the ’850 blade assembly must be discarded in its entirety when the blade needs to be replaced increasing the effective price of the blade assembly compared to the present blade assembly. Second, the clinch mechanism is somewhat complex and creates sanitation issues requiring periodic cleaning. Third, the multiple welds to the blade tend to cause brittleness and potential weakening of the blade.

The present invention overcomes the drawbacks listed above.

BRIEF SUMMARY OF INVENTION

The present invention provides a simpler slicer blade assembly than the prior art. The new assembly eliminates the welding required by the prior art. The critical parts of the new blade assembly are removably attached to each other, as opposed to being welded, reducing the effective cost of the new assembly, since the support assembly for the present invention is reusable.

Since these automatic slicing machines are often run 24 hours per day when the produce items are ready, reduced down time of the machinery is of vital importance. The present invention facilitates a less expensive cost of replacing the blade, since the support members for the blade itself are reusable. The three critical blade assembly components, i.e. the blade, the block and the nut are removably connected to each other and to their support members. Unlike the prior art, the blade itself may be removed and replaced without replacing the block and nut.

In one embodiment of the invention, the blades are adjustable, for example a single blade may be used in either a 6, 7 or 8 segment slicer assembly.

A primary object of the invention is to provide an improved slicer blade assembly for high speed automatic product slicing machines wherein the blades may be replaced without replacing the blade support members.

A further object is to provide an improved slicer blade assembly wherein neither the blade itself nor its support structure, is subjected to any welding, reducing complexity of design and avoiding undue brittleness of the blade caused by welding.

Another object is to provide blades that are adjustable and usable in two or more slicer assemblies.

A further object is to provide a blade assembly wherein the lead time of providing replacement blades is reduced.

Further objects and advantages will become apparent from the following description and drawings.

DETAILED DESCRIPTION OF DRAWINGS

FIGS. 1-4 are taken from prior art U.S. Pat. No. 7,610,850, which patent is hereby incorporated herein by reference. The text of that patent is not repeated here for the sake of brevity. However, it is significant to note that if a given blade, such as prior art blade 44 (FIG. 3), needs to be replaced, the blade 44 and clinch buckle means 60 (FIG. 3) must be discarded and a new blade assembly of blade 44 and clinch buckle means 60 must be replaced as a unit. With the present invention, the blade alone may be replaced and all support items for the blade may be reused.

Figure 16:
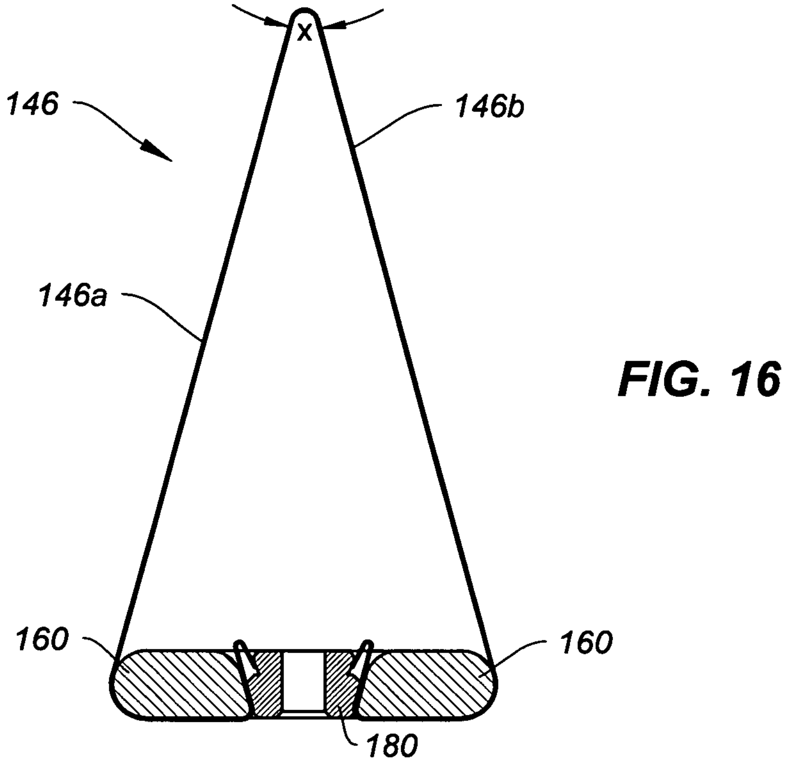
FIGS. 16 and 17 are schematics showing how the blade 146 may be adjusted.
Figure 17:
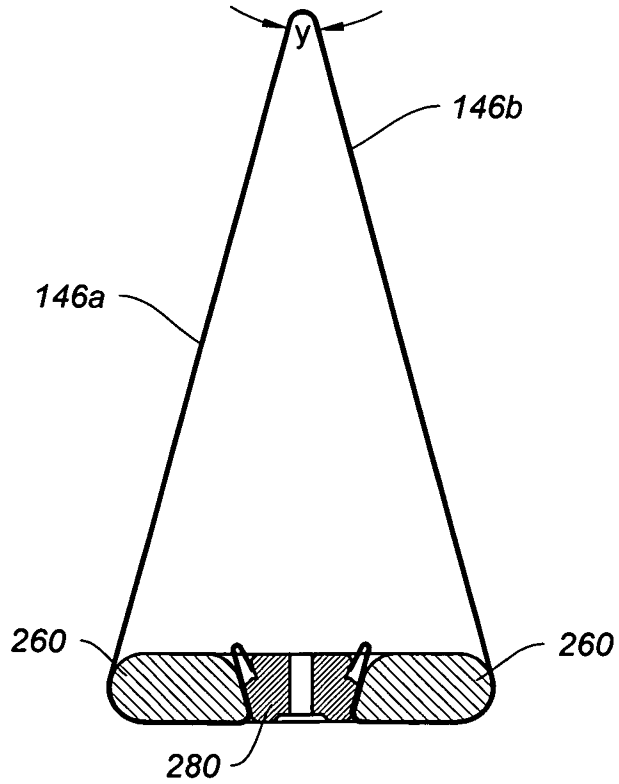

Another significant aspect of the invention is that each individual blade is somewhat adjustable and may be used in multiple slicer assembly configurations as shown in FIGS. 16 and 17 and described below. For example, a single blade of the present invention may be adjusted to be used in slicer assemblies having either 6, 7 or 8 segments. That adjustability is a new feature in this art. The apex of each blade may be slightly bent in the field to fit several configurations desired by the user. This feature makes it much easier and cost effective to store and to supply usable replacement blades.

It is also significant to note that in using the prior art clinch buckle means 60 (FIG. 4) fillet welds are applied in eight places to solidify the connection between the blade 44 and clinch buckle means 60 (see column 5, lines 18-20). No welds are required with the present blade assembly.

Figure 1:
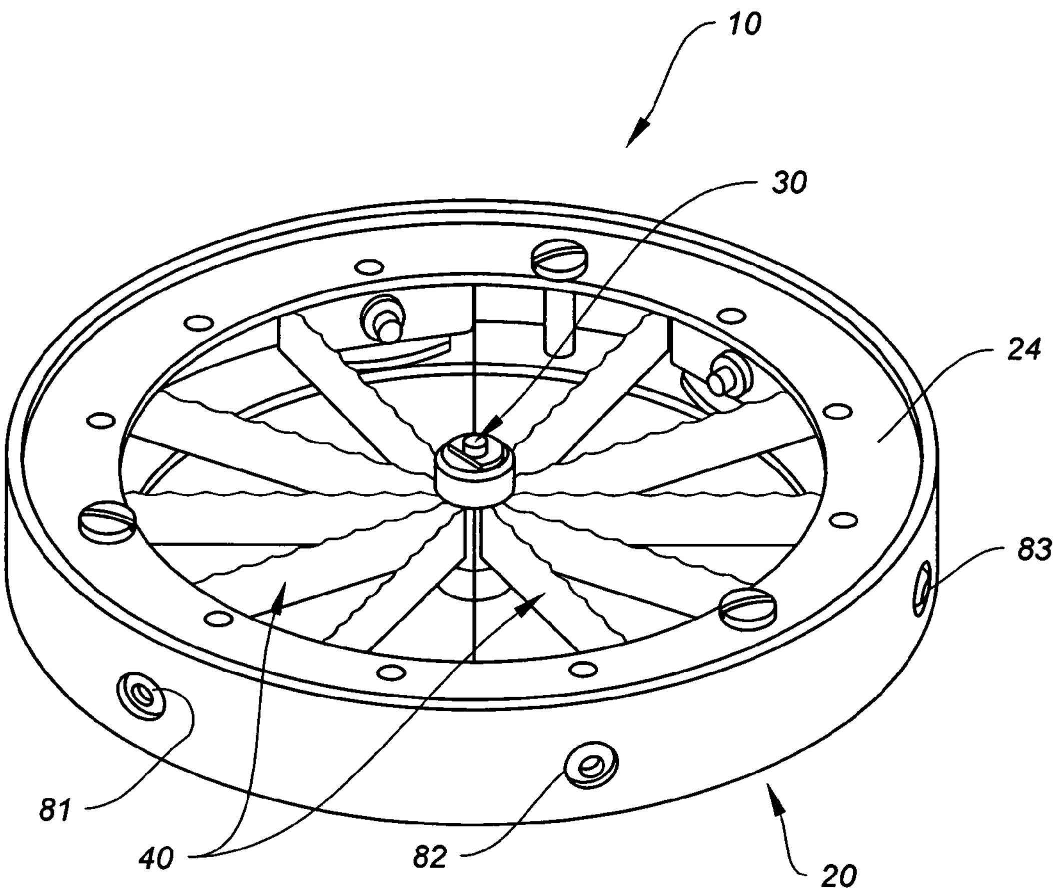
FIG. 1 (Prior Art)
FIG. 1 is a perspective view of a prior art slicer assembly shown in U.S. Pat. No. 7,610,850.
Figure 2:
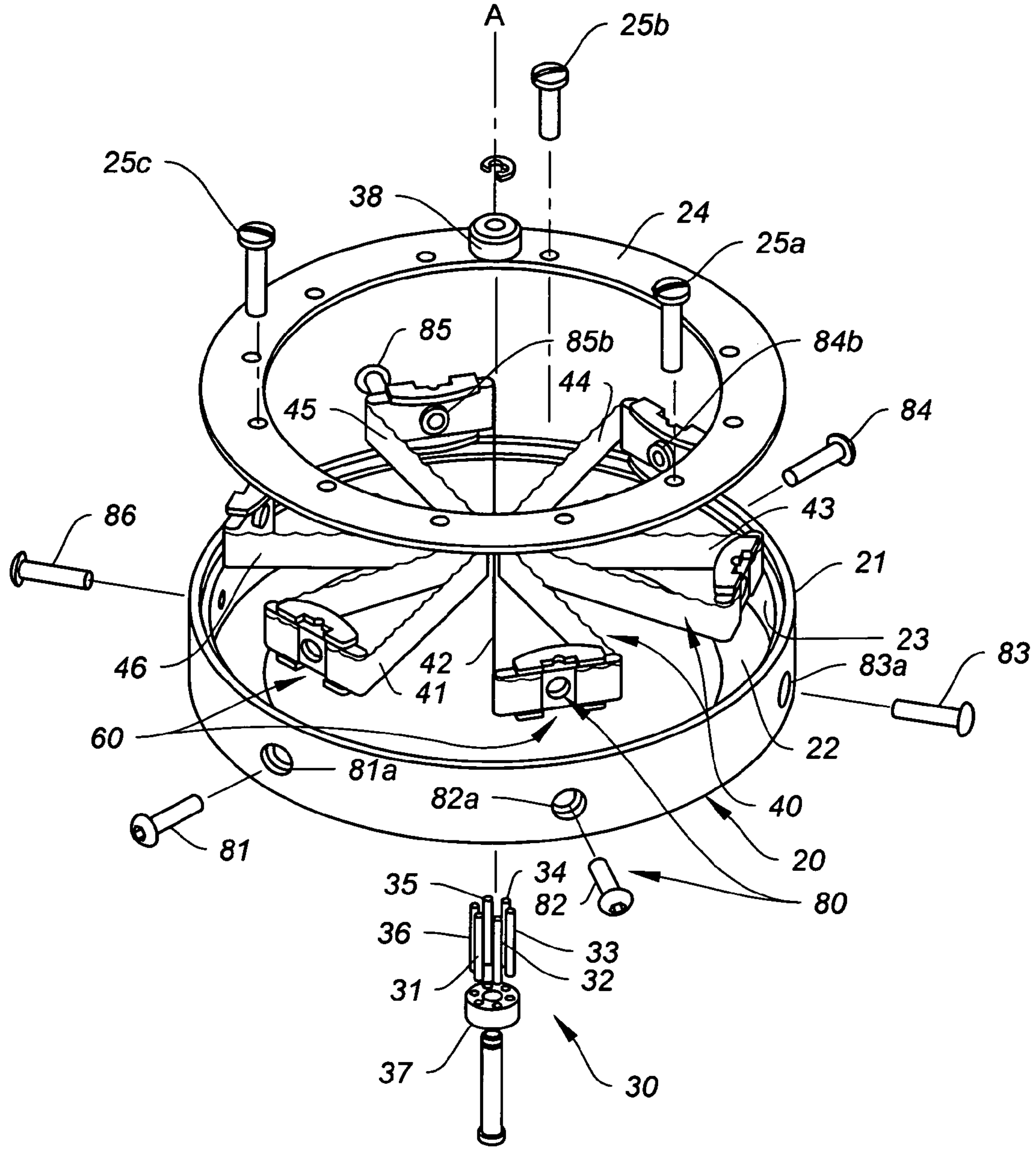
FIG. 2 (Prior Art)
FIG. 2 is an exploded view of the prior art slicer assembly of FIG. 1.
Figure 4:
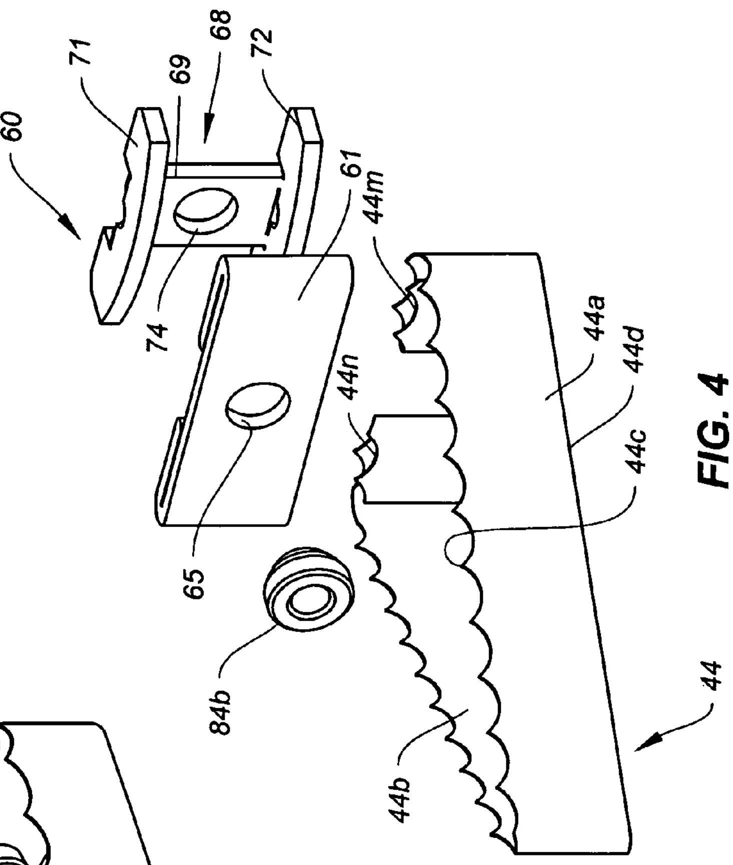
FIG. 4 (Prior Art)
FIG. 4 is an exploded view of the prior art blade assembly of FIG. 3.
Figure 3:
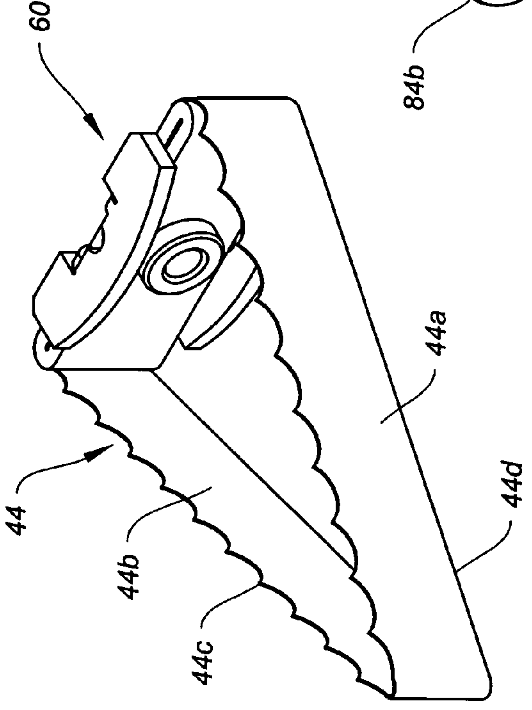
FIG. 3 (Prior Art)
FIG. 3 is a perspective view of the prior art blade assembly used in FIGS. 1 and 2.
Figure 5:
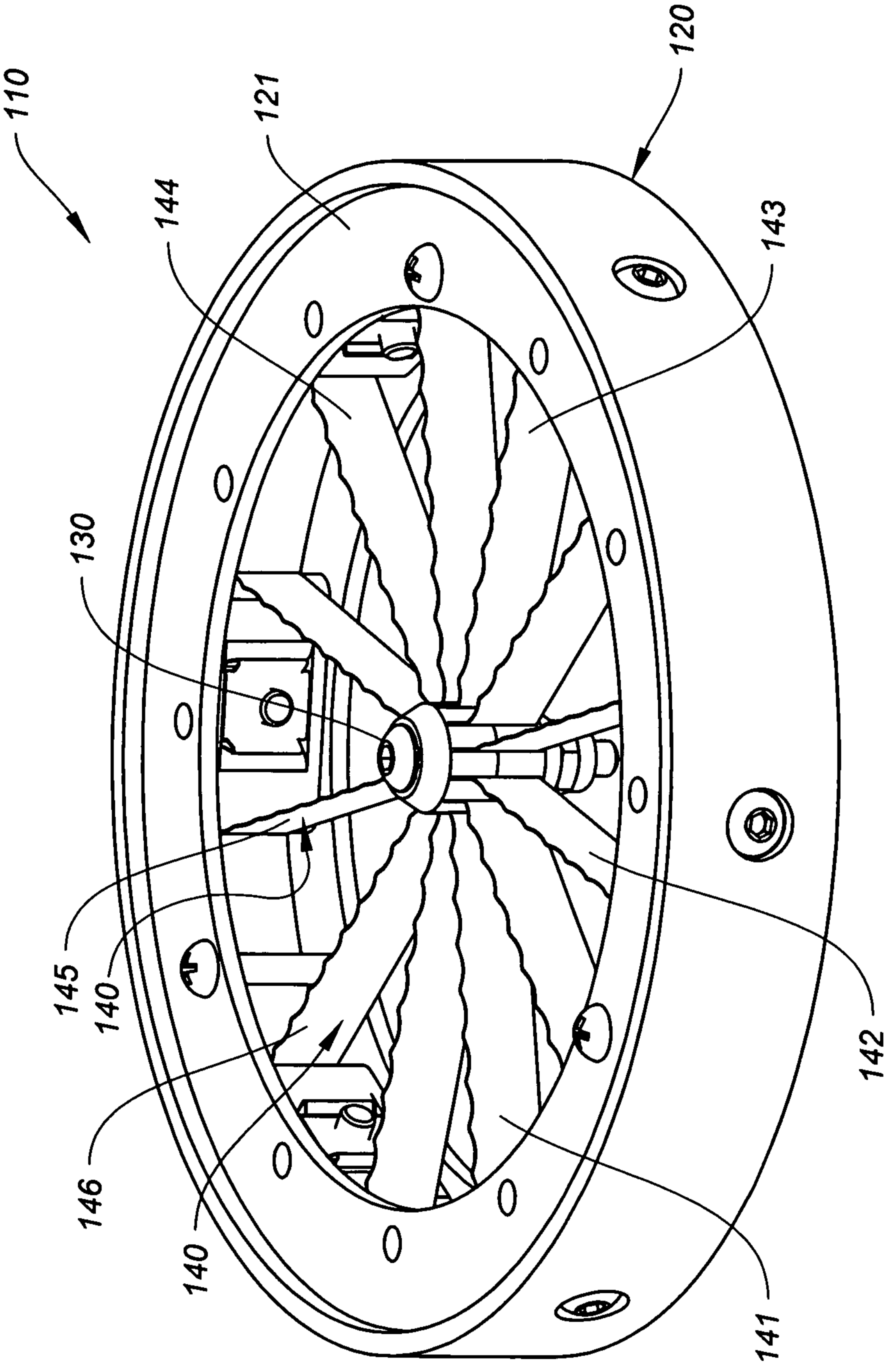
FIG. 5 is a perspective view of a fully assembled slicer assembly of the present invention.

FIG. 5 is a perspective view of an assembled slicer assembly 110 of the present invention. An outer blade support ring 120 is provided, and an inner blade support hub 130 at the center of the circle formed by ring 120 removably supports the inner portion or apex of each blade.

Figure 6:
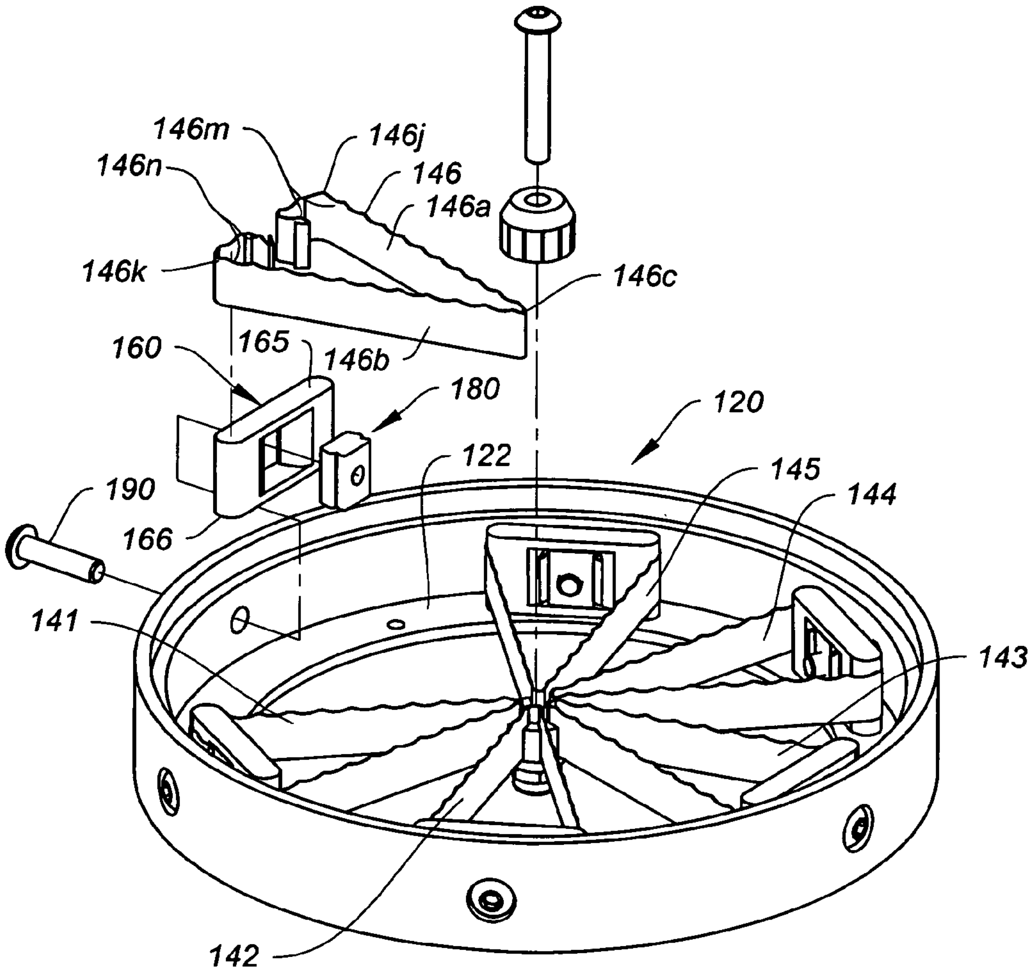
FIG. 6 is an exploded view of the slicer assembly of FIG. 5.

FIG. 6 is an exploded view of the present slicer assembly 110 of FIG. 5.

As shown in FIGS. 5 and 6, a circular array of six generally Vshaped blades 141-146 is provided. Each blade, such as blade 146, has a first leg 146*a*, a second leg 146*b* and an apex 146*c* having an apex angle "X" formed by first and second legs 146*a*, 146*b*, respectively. Each of legs 146*a*, 146*b* has a tip 146*j*, 146*k* at its end opposite apex 146*c*. Each tip 146*j* and 146*k* has a generally U-shaped tab 146*m*, 146*n* formed therein.

Figure 7:
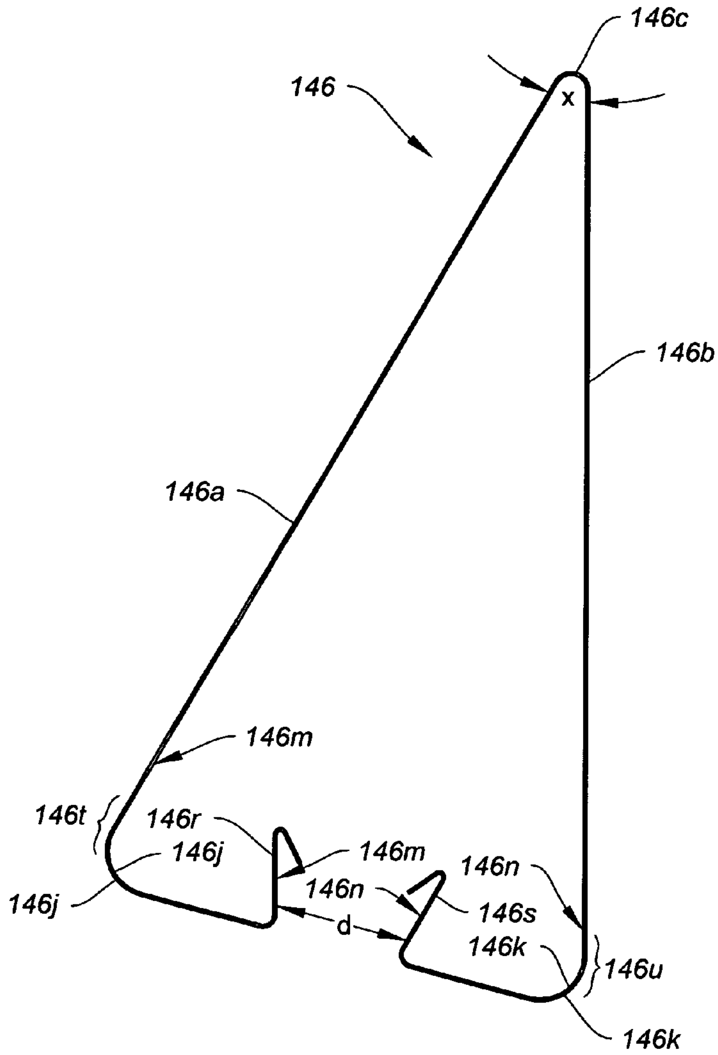
FIG. 7 is a plan view of a single blade of the present invention.
Figure 8:
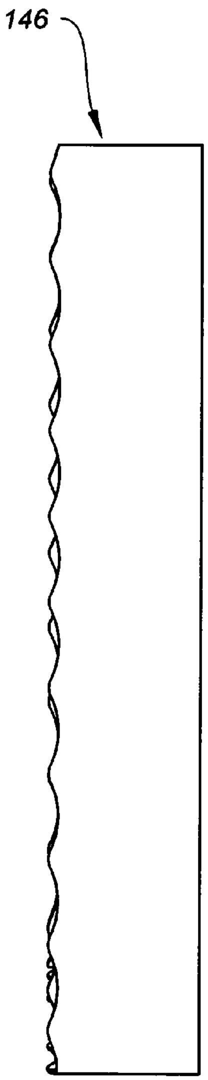
FIG. 8 is a side elevational view of the blade of FIG. 7.

FIG. 7 is a plan view of blade 146, and FIG. 8 is a side elevational view of blade 146. Blade 146 (as well as all blades) is a single, continuous strip of stainless steel. The blades have a thickness of 180 to 220 microns, and may be as thin as 100 microns.

Each U-shaped tab 146*m*, 146*n* has two arms, for example U-shaped tab 146*m* has one arm formed by leg 146*a* and a second free arm 146*r* formed by the free end of tab 146*m*. Similarly, U-shaped tab 146*n* has a free arm 146*s*. Both of the second or free arms 146*r* and 146*s* extend in a direction generally toward the apex 146*c* of each blade, and the second arms 146*r* and 146*s* form a taper wherein the distance "d" between said second arms 146*r* and 146*s* increases in a direction toward said apex 146*c*.

As noted above, apex angle "X" is adjustable by simply bending first and second legs 146*a*, 146*b* inwardly or outwardly. This adjustability feature allows a single blade, such as blade 146, to be utilized in slicer assemblies having, for example, 6, 7 or 8 segments.

As shown in FIG. 7, each tip 146*j* and 146*k* of legs 146*a*, 146*b*, respectively, has a U-shaped tab 146*m* and 146*n* formed adjacent tips 146*j* and 146*k*, respectively. U-shaped tabs 146*m* and 146*n* have first arms 146*t* and 146*u* which are the segments of legs 146*a* and 146*b* adjacent tips 146*j* and 146*k*. U-shaped tabs 146*m* and 146*n* have second or free arms 146*r*, 146*s* respectively, which extend in a direction generally toward apex 146*c*. However, the second or free arms 146*r* and 146*s* are tapered with respect to each other, the distance "d" between those arms increasing in a direction towards apex 146*c*. This taper facilitates a frictional fit between each blade, such as blade 146 for example, and each block and tapered nut as described below.

As shown in FIG. 6, a block 160 snaps into position in the U-shaped arms of blade 146.

Figure 9:
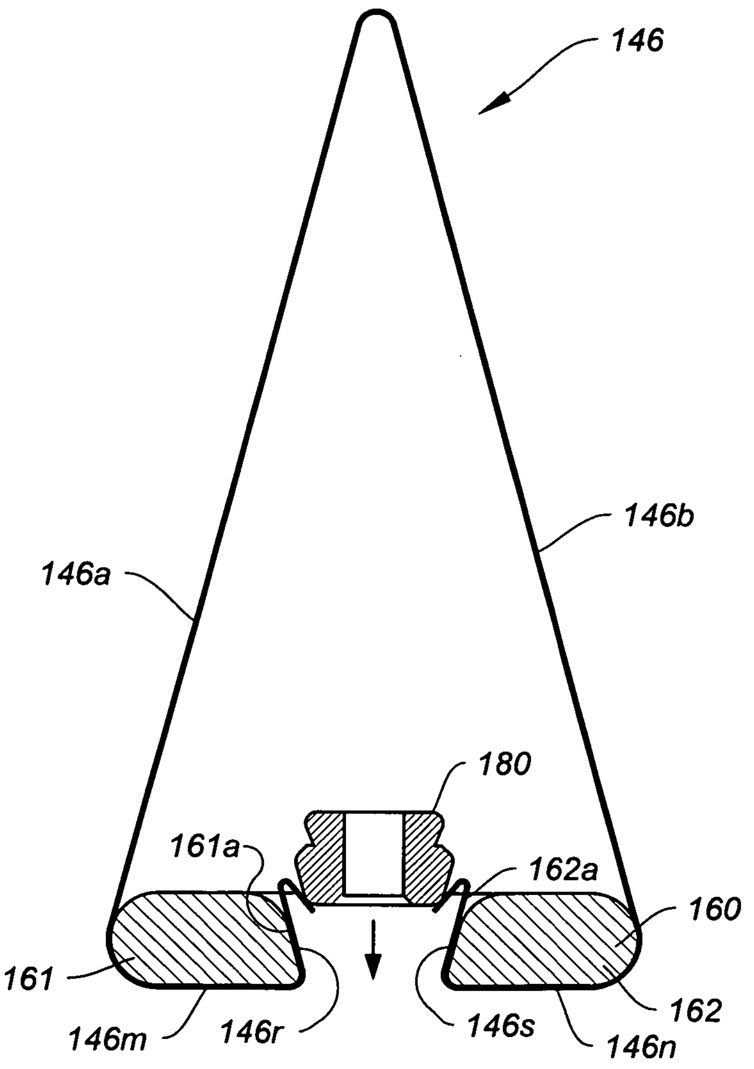
FIG. 9 is a schematic illustration showing the blade and block of the present invention as the tapered retaining nut is about to be installed.

FIG. 9 is a schematic illustration showing blade 146 with block 160 snapped into position in U-shaped tabs 146*m* and 146*n*. Tapered nut 180 is about to be inserted into the space between the tapered, second or free arms 146*r* and 146*s* of tabs 146*m*, 146*n* to engage free arms 146*r* and 146*s* and to engage the inner side walls 161*a*, 162*a* of nut 180. This engagement by nut 180 forms a robust mechanical bond between the blade 146 and its support block 160 which does not require any welding.

Figure 10:
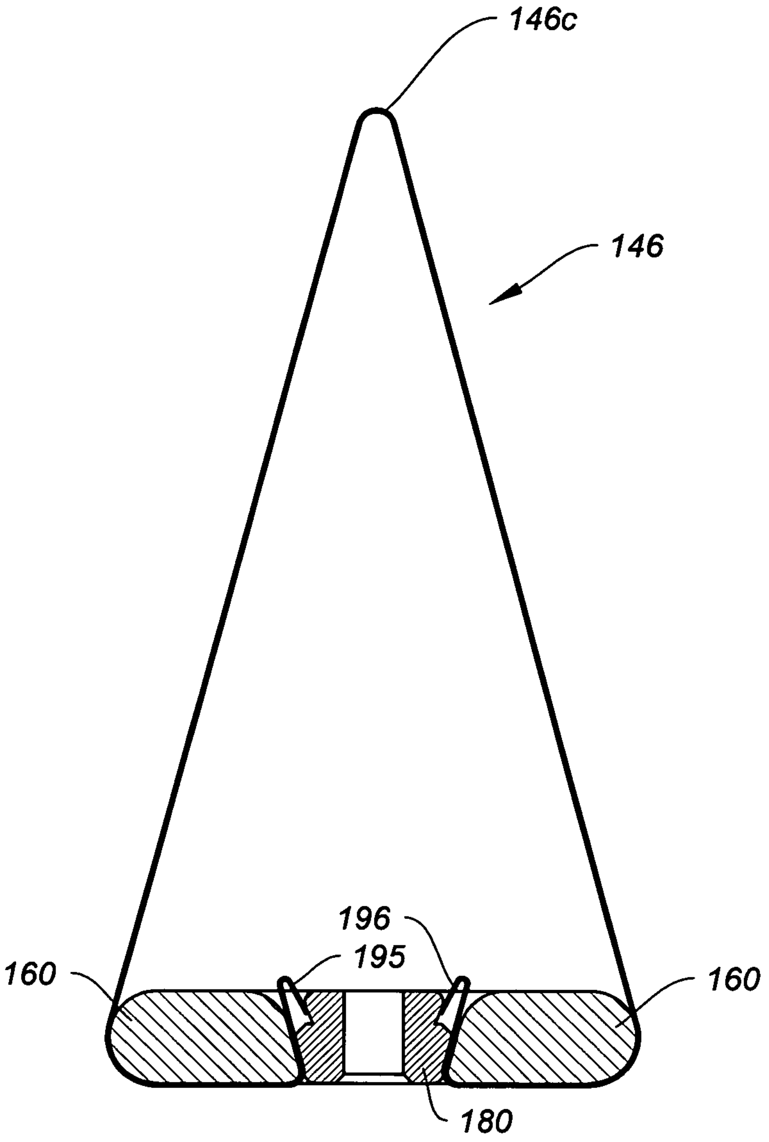
FIG. 10 is a schematic showing the blade assembly of the present invention fully assembled.

FIG. 10 shows the blade assembly in its final assembled configuration. Tapered nut 180 engages the second arms 146*r* and 146*s* of U-shaped tabs 146*m*, 146*n* of blade 146 and secures those arms 146*r*, 146*s* against block 160; forming an extremely strong, non-welded mechanical bond between the blade 146, block 160 and nut 180.

Figure 11:
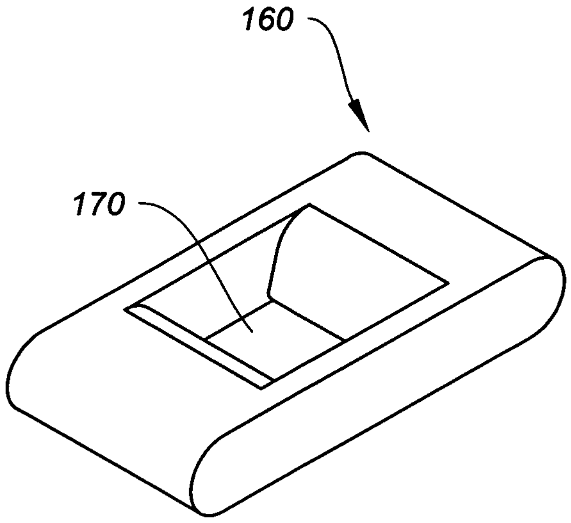
FIG. 11 is a perspective view of block 160.
Figure 12:
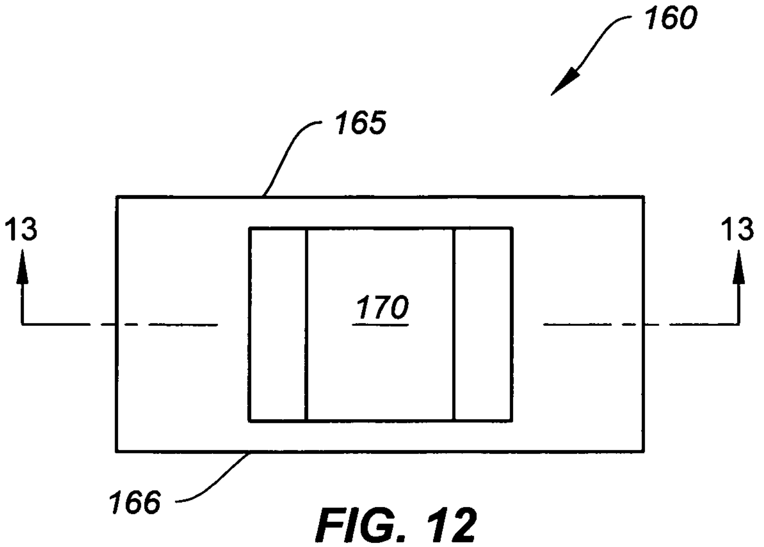
FIG. 12 is a plan view of the block 160 shown in FIG. 11.
Figure 13:
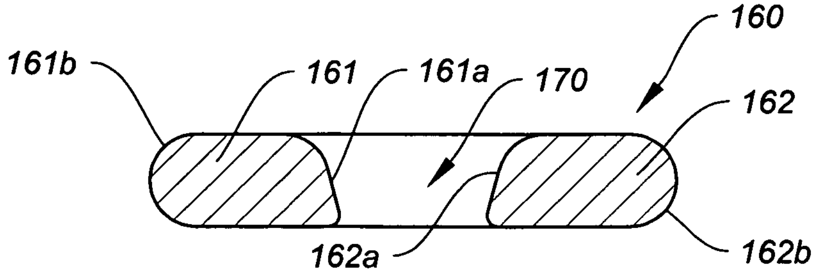
FIG. 13 is a section on the line 13-13 of FIG. 12.

FIGS. 11, 12 and 13 illustrate block 160 in perspective, plan and sectional views, respectively. Block 160 is rectangular in shape, having a rectangular recess or opening 170 formed in its center, recess 170 extending through block 160. Block 160 has side walls 161 and 162 having tapered surfaces 161*a* and 162*a* respectively. Side walls 161 and 162 are sized to snap into position in U-shaped tabs 146*m* and 146*n* (FIG. 9), completely filling the space between legs 146*a*, 146*b* and free arms 146*r*, 146*s* (FIG. 9). The tapered surfaces 161*a*, 162*a* of side walls 161, 162 are tapered to the same angle as the tapered angle between free arms 146*r* and 146*s*. As shown best in FIG. 9, tapered nut 180 will be pressed downwardly into position as shown in FIG. 10 to form a robust, removable mechanical connection between the blade 146, block 160 and nut 180.

As shown best in FIG. 12, block 160 has an upper surface 165 and a lower surface 166, which engage surfaces of cover 121 (FIG. 5) and support ledge 122 (FIG. 6).

Figure 14:
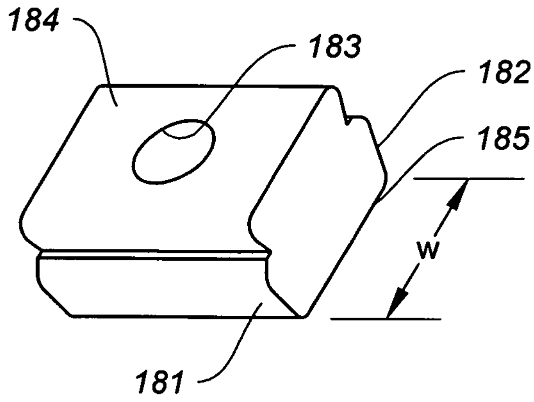
FIG. 14 is a perspective view of nut 180.
Figure 15:
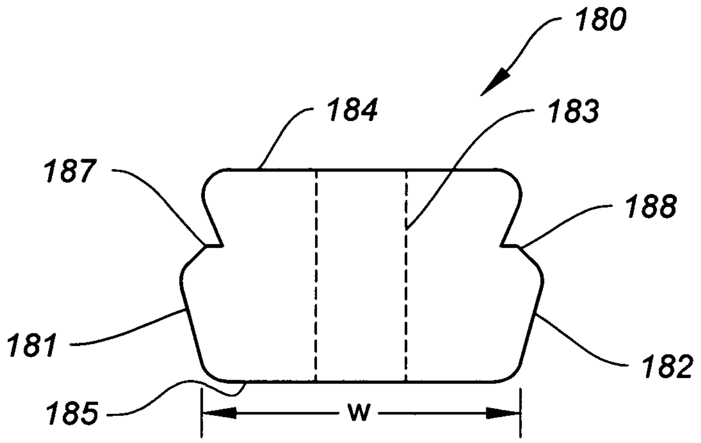
FIG. 15 is a front elevational view of nut 180 shown in FIG. 14.

FIGS. 14 and 15 illustrate nut 180. Nut 180 has a width "w," tapered side walls 181, 182 and a passageway 183 that extends through nut 180 from its top surface 184 to its bottom surface 185. Tapered side walls 181, 182 are tapered to match the taper of surfaces 161*a*, 162*a* of block 160 (FIG. 13).

Nut 180 has recessed notches 187, 188 formed in side walls 181, 182 respectively to engage bent ears 195, 196 (FIG. 10) to retain nut 180 in its assembled position shown in FIG. 10 and to assist in retaining nut 180 in position during assembly and disassembly.

As shown in FIG. 6, when threaded member 190 extends inwardly from outer blade support ring 120, and engages tapered and threaded nut 180, blade 146 is tensioned by the tightening of threaded member 190. Block 160 has upper and lower surfaces 165, 166 that engage cover 121 (see FIG. 5) and lower support ledge 122 of outer support ring 120. Block 160, along with blade 146, is free to move only inwardly or outwardly relative to the center of ring 120 to tension or loosen blade 146.

Blade 146 may be removed, if it becomes unusable, by simply loosening threaded member 190, and separating nut 180 and block 160 from blade 146. A new blade is connected to block 160, nut 180 is engaged with threaded member 190, and a new blade is inserted very quickly, reusing the old block 160 and old nut 180.

Optional bent ears 195 and 196 are formed at the ends of second or free arms 146*r*, 146*s* to assist in retaining nut 180 in position during assembly and during use of the blade assembly.

The block 160, nut 180 and the U-shaped tabs 146*m* and 146*n* together form a "clinch means" for removably interlocking with and connecting with U-shaped tabs 146*m* and 146*n* to form a robust, removable mechanical connection supporting the blade 146, without requiring any welding.

FIGS. 16 and 17 illustrate schematically how blade 146 is adjustable, and for example, may be used in 6, 7 or 8 segment blade assemblies.

Assume the user wishes to adjust blade 146 shown in FIG. 16 to be used in a blade assembly having fewer segments. The user simply disconnects block 160 and nut 180 from blade 146. The user then bends legs 146*a* and 146*b* outwardly to form apex angle "y" which is larger than apex angel "x." A wider block 260 and a wider nut 280 are placed in position as shown in FIG. 17.

In similar fashion, blade 146 may be adjusted to be used in a blade assembly having more segments. The user removes block 160 and nut 180 and bends legs 146*a* and 146*b* toward each other forming a smaller apex angle. A narrower block and nut (not shown) are attached to the tips of the blade 146.

The adjustability feature allowing a single blade to be used in blade assemblies having different numbers of segments is unknown to applicant in high speed, automatic slicing machinery.

The side walls 161, 162 of block 160 have curved surfaces 161*b*, 162*b* that engage the curved tips 146*j* and 146*k* of legs 146*a* and 146*b* (FIG. 7).

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated.

What is claimed is:

1. In an apparatus for automatically slicing apples or other produce items into a plurality of wedge shaped segments, wherein said apparatus has a circular array of generally V-shaped blades, each of said blades having first and second legs, an apex having an apex angle formed by said first and second legs, and having first and second tips at the ends of said first and second legs, respectively, wherein an outer blade support ring carries said array of blades, and wherein an inner blade support hub removably supports each of said blades at said apex, the improvement comprising:

first and second U-shaped tabs formed at said tips of each of said legs each of said first and second U-shaped tabs having first and second arms, said first arm comprising a section of said first and second legs of said blades adjacent said tips of said legs, and each of said second arms comprising a free arm of said U-shaped tabs, wherein said free arms of each of said tabs extend in a direction generally toward said apex and also form a tapered surface between said free arms wherein the distance between said second arms increases closer to said apex, clinch means for each of said blades for removably interlocking with and connecting with said first and second U-shaped tabs of each blade, wherein each clinch means includes a block having a rectangular recess, said block extending between and interlocking with said first and second U-shaped tabs without any welding wherein each said clinch means also includes a threaded and tapered nut removably carried in said recess wherein said nut frictionally engages said second arm of both of said first and second U-shaped tabs, and blade tensioning means for each of said blades, said tensioning means including a threaded member extending from said outer support ring, through each said block, and threadably connecting to each said tapered nut, whereby tightening said threaded member tensions said blade, and whereby loosening said threaded member and disconnecting said threaded member from said nut and said block allows said blade to be quickly removed, allowing a replacement blade to be inserted, and said tapered nut and said block to be reused with said replacement blade.

2. The apparatus of claim 1 wherein the apex angle of each blade is bendable, allowing each blade to be used in two or more different slice blade assemblies with different numbers of segments.

* * * * *